(No Model.)

J. E. CAMPBELL.
TIRE BOLT WRENCH.

No. 522,104. Patented June 26, 1894.

WITNESSES:
Fred G. Dieterich
Edw. W. Byrn.

INVENTOR
Joseph E. Campbell.
BY Munn & Co.
ATTORNEYS.

UNITED STATES PATENT OFFICE.

JOSEPH E. CAMPBELL, OF FAIRFAX STATION, VIRGINIA, ASSIGNOR OF ONE-HALF TO ECCA R. SWETNAM, OF SAME PLACE.

TIRE-BOLT WRENCH.

SPECIFICATION forming part of Letters Patent No. 522,104, dated June 26, 1894.

Application filed December 14, 1893. Serial No. 493,652. (No model.)

*To all whom it may concern:*

Be it known that I, JOSEPH E. CAMPBELL, of Fairfax Station, in the county of Fairfax and State of Virginia, have invented a new and useful Improvement in Tire-Bolt Wrenches, of which the following is a specification.

The bolts which fasten the tires to the fellies of vehicle wheels are usually constructed with round countersunk heads which have no nick in them, and after the tire has become worn and is required to be renewed there is great difficulty in removing the bolts, owing to the fact that the effort to turn off the nut on the inside of the felly by an ordinary wrench causes the entire bolt to swivel and turn inside the felly and tire so that the nut cannot be turned over the threads of the bolt. This is so by reason of the fact that there is no nick in the head of the bolt to receive a screw driver with which to hold the bolt while turning off the nut, and even if there was it would have become obliterated or worn off in the wear of the tire. This difficulty is further exaggerated by the fact that the nut and bolt from constant wetting become rusted together, so as to render the starting of the nut on the bolt all the more difficult. The result is that in many cases the end of the bolt carrying the nut has to be cut off with a cold chisel at the expense of much time and tedious labor, and the scarifying and possible splitting of the felly.

My invention is designed to provide a simple and practical tool for quickly and conveniently removing these nuts and bolts without damage to the felly, and to that end it consists in the peculiar construction and arrangement of the parts which I will now proceed to describe with reference to the drawings, in which—

Figure 1:
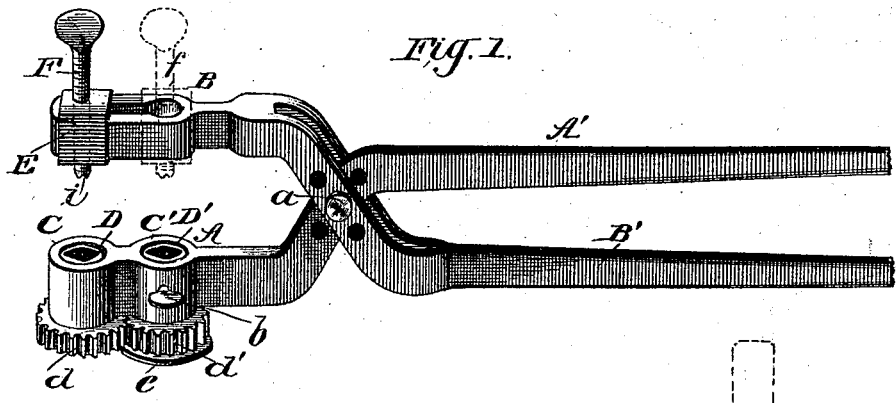
Figure 2:
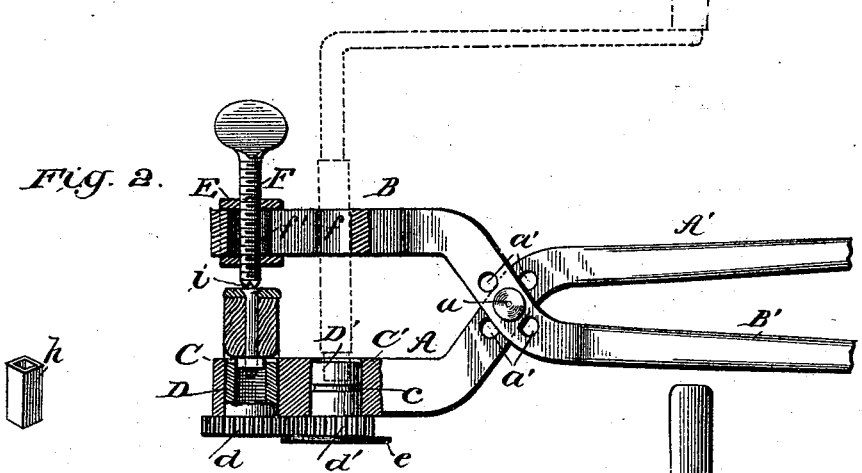
Figure 3:
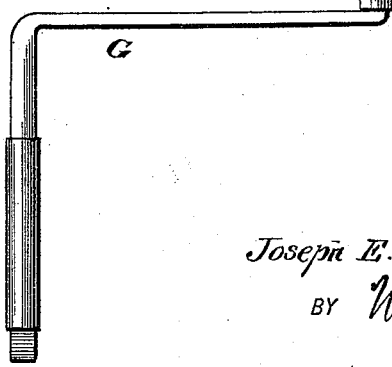

Figure 1 is a perspective view of the wrench. Fig. 2 is a side view partly in section showing the wrench applied to the tire bolt, the position of the turning crank being indicated in dotted lines, and Fig. 3 is a side view of the turning crank detached.

In the drawings A, B are the two jaws of the wrench which are constructed upon the ends of a pair of lever arms A' B' fulcrumed to each other by a pin or bolt $a$ to form a species of tongs. The jaws A and B are parallel to each other, and one of them A has two parallel sockets C C' opening through said jaw cross wise or at right angles to its length. In each of these sockets is arranged a swiveling head D D' which are retained in their respective sockets by a screw $b$ which is tapped through the side of the socket and whose point is made to enter a peripheral groove $c$ on the exterior of the head. Each of the heads has a square hole running entirely through it, and on the lower end of each head is formed a small gear wheel $d$ and $d'$ which are in mesh with each other. One of these gear wheels may have a flange $e$ at its lower edge underlapping the other gear wheel, in which case, said other gear wheel will need no peripheral groove and set screw to hold it in its socket. The other jaw B has an oblong slot in it, in each end of which is formed an enlarged rest, bearing, or seat $f$, and $f'$, to receive the winding crank which turns the heads, as shown in dotted lines. Embracing the two sides of this jaw is a sliding frame E which has tapped through it a clutch screw F whose body portion passes through the slot, and whose end is armed with clutch points $i$ of hardened steel which are adapted to press against the bolt head and, by partly burying themselves in it, rigidly lock and hold the bolt from turning.

To operate the wrench, it is applied to the tire, as shown in Fig. 2, with one of the wrench heads embracing the nut on the inside of the felly, and with the clutch screw turned down upon the head of the bolt tightly so that its points bury in and rigidly hold the bolt from turning. The turning handle G, whose end is squared and made to fit the square cavity of the other head D', is then inserted through the bearing or rest in the other jaw, as shown in Fig. 2, and is then turned in a direction to unscrew the nut, which is quickly turned off by the rotation of the wrench head embracing it, the motion being transmitted through the meshing gears.

To hold the jaws at a greater or less distance from each other so as to receive fellies of different thickness, and at the same time to preserve the parallel position of the jaws, the fulcrum pin that connects the jaws may be adjusted in any one of the several holes $a'$ so as to separate said jaws the required distance. By making these holes in the oblique portion of the lever shanks, the jaws are adjusted to or from each other in parallel position, which is necessary in order to preserve the alignment of the wrench head and clutch screw.

In making use of the device, the turning crank may be adjusted to either one of the bearings or rests of the slotted jaws, and the end of the crank fits into either one of the square cavities of the wrench heads, depending upon which one of the wrench heads is applied to the nut. In fitting the turning crank to either one of the wrench heads, the clutch screw is adjusted into alignment with the other head so as to clutch the bolt, said adjustment being permitted by the sliding character of the frame E carrying the said clutch screw.

The wrench heads are formed with their square holes extending all the way through them, so that in some applications of the device the bottom of the wrench head may be applied to a nut, as in cases where the bolt is not required to be held by the clutch screw.

To accommodate different sizes of nuts the wrench head is supplied with a series of angular bushings $h$ which may be dropped into the square cavity of the wrench head to diminish its size as may be required.

Having thus described my invention, what I claim as new, and desire to secure by Letters Patent, is—

1. A tire bolt wrench consisting of a pair of pivoted jaws, one of said jaws being provided with two parallel swiveling and rotatable wrench heads arranged at right angles to the jaws and connected by interlocking wheels, and the other jaw being provided with an adjustable clutch screw arranged to be moved on the jaw into alignment with either wrench head substantially as and for the purpose described.

2. A tire bolt wrench, consisting of a pair of pivoted jaws, one of the jaws carrying two swiveling wrench heads connected by gears, and the other jaw being slotted and provided at its opposite ends with bearings or rests for a turning crank, a sliding frame provided with a clutch screw arranged to be adjusted in line with either wrench head, and a detachable turning crank having its end adapted to pass through either of said rests and be seated in one of the wrench heads substantially as shown and described.

3. A tire bolt wrench consisting of a pair of pivoted jaws, one of which is provided with two swiveling wrench heads having intermeshing gears on their lower ends and one of said wrench heads having a grooved periphery with retaining screw and also a flange underlapping the gear of the other wrench head, and the other jaw being provided with an adjustable clutch screw substantially as shown and described.

JOSEPH E. CAMPBELL.

Witnesses:
W. E. GRAHAM,
E. R. HOLBROOK.